United States Patent [19]

Melquist et al.

[11] Patent Number: 4,767,738

[45] Date of Patent: Aug. 30, 1988

[54] LEAD ALUMINUM BORATE

[75] Inventors: John L. Melquist, Naperville; Melvin L. Luetkens, Jr., Lisle, both of Ill.

[73] Assignee: Amoco Corporation, Chicago, Ill.

[21] Appl. No.: 932,880

[22] Filed: Nov. 20, 1986

[51] Int. Cl.[4] .......................... B01J 21/02; B01J 27/24; C01B 15/12; C01B 35/00

[52] U.S. Cl. .................................. 502/202; 502/201; 502/200; 423/279; 423/280; 423/276; 423/277; 501/153

[58] Field of Search ....................... 502/202, 201, 200; 423/279, 280; 501/153

[56] References Cited

U.S. PATENT DOCUMENTS

| | | | |
|---|---|---|---|
| 3,843,552 | 10/1974 | Jouy et al. | 502/202 |
| 3,926,845 | 12/1975 | Cichowski | 502/213 X |
| 3,965,206 | 6/1976 | Montgomery et al. | 585/435 X |
| 3,980,580 | 9/1976 | Fox et al. | 502/341 X |
| 3,983,052 | 9/1976 | McArthur | 502/26 |
| 3,990,995 | 11/1976 | McArthur | 502/207 |
| 4,039,471 | 8/1977 | McArthur | 502/26 |
| 4,310,357 | 1/1982 | Matsuura et al. | 501/153 X |
| 4,443,642 | 4/1984 | Keppel et al. | 585/428 |
| 4,489,213 | 12/1984 | Korach | 585/467 |
| 4,559,269 | 12/1985 | Beach et al. | 423/279 X |

Primary Examiner—H. M. S. Sneed
Assistant Examiner—William G. Wright
Attorney, Agent, or Firm—Matthew R. Hooper; William H. Magidson; Ralph C. Medhurst

[57] ABSTRACT

The present invention is a novel crystalline lead aluminum borate composition characterized by a unique x-ray diffraction pattern.

6 Claims, 4 Drawing Sheets

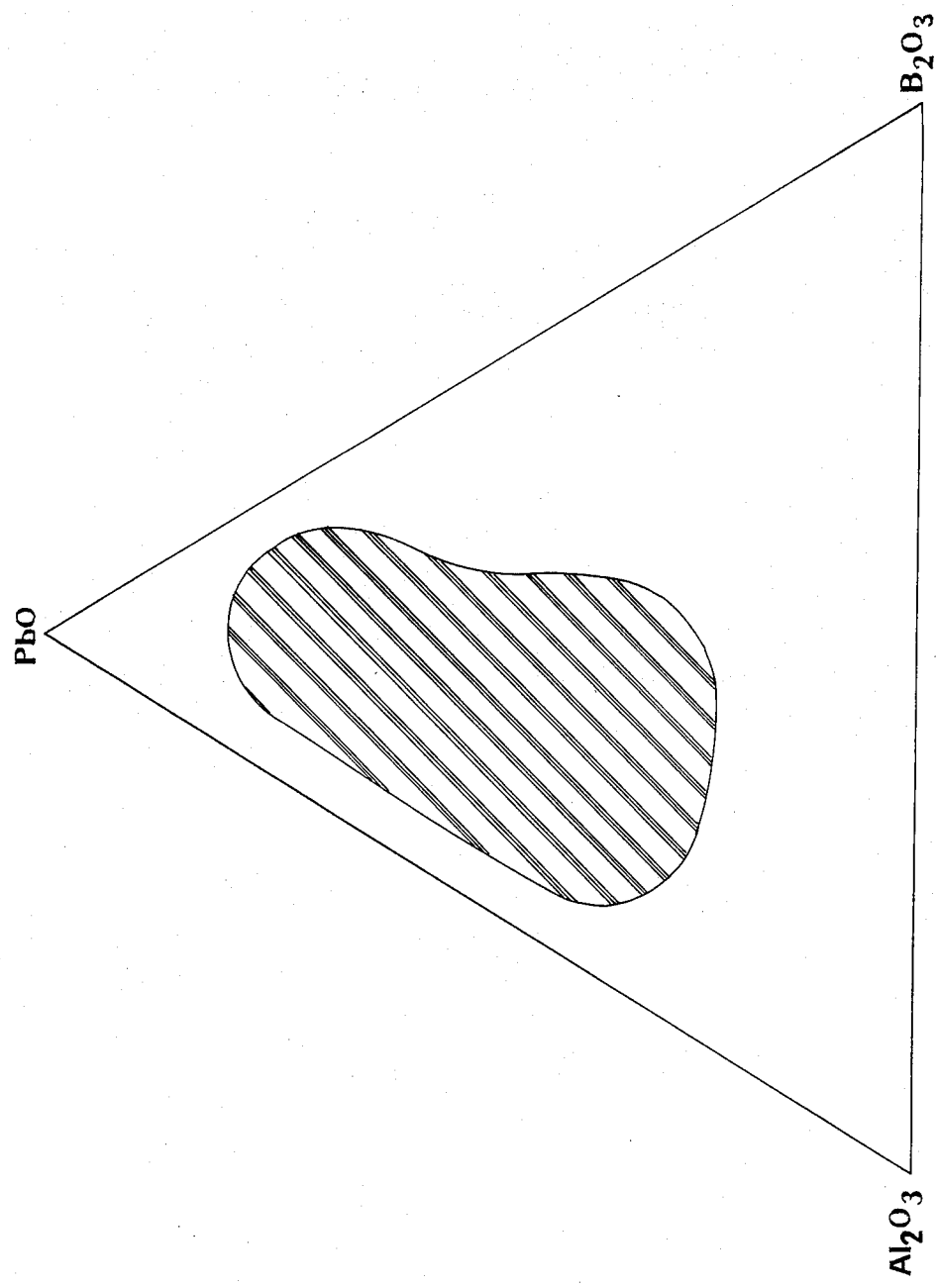

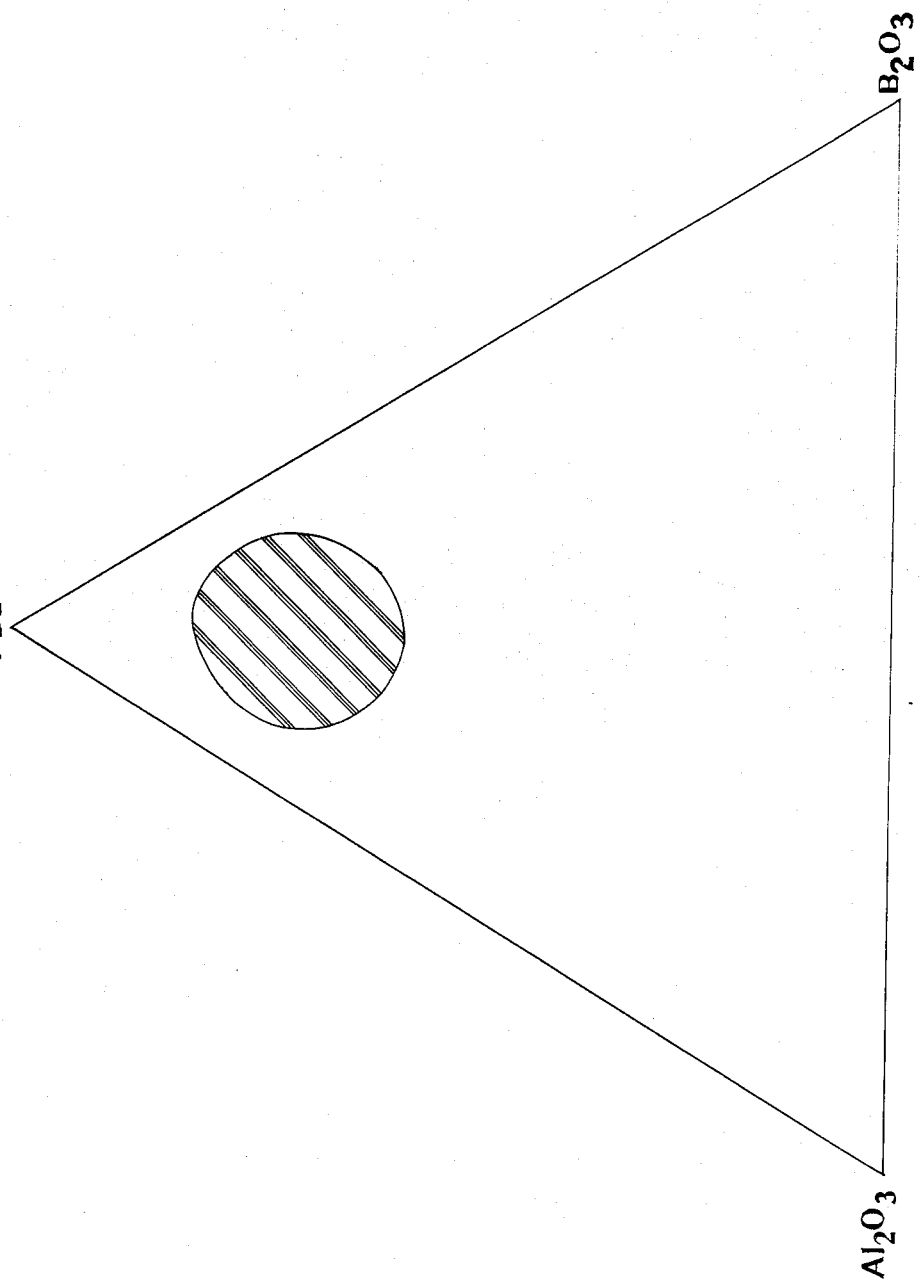

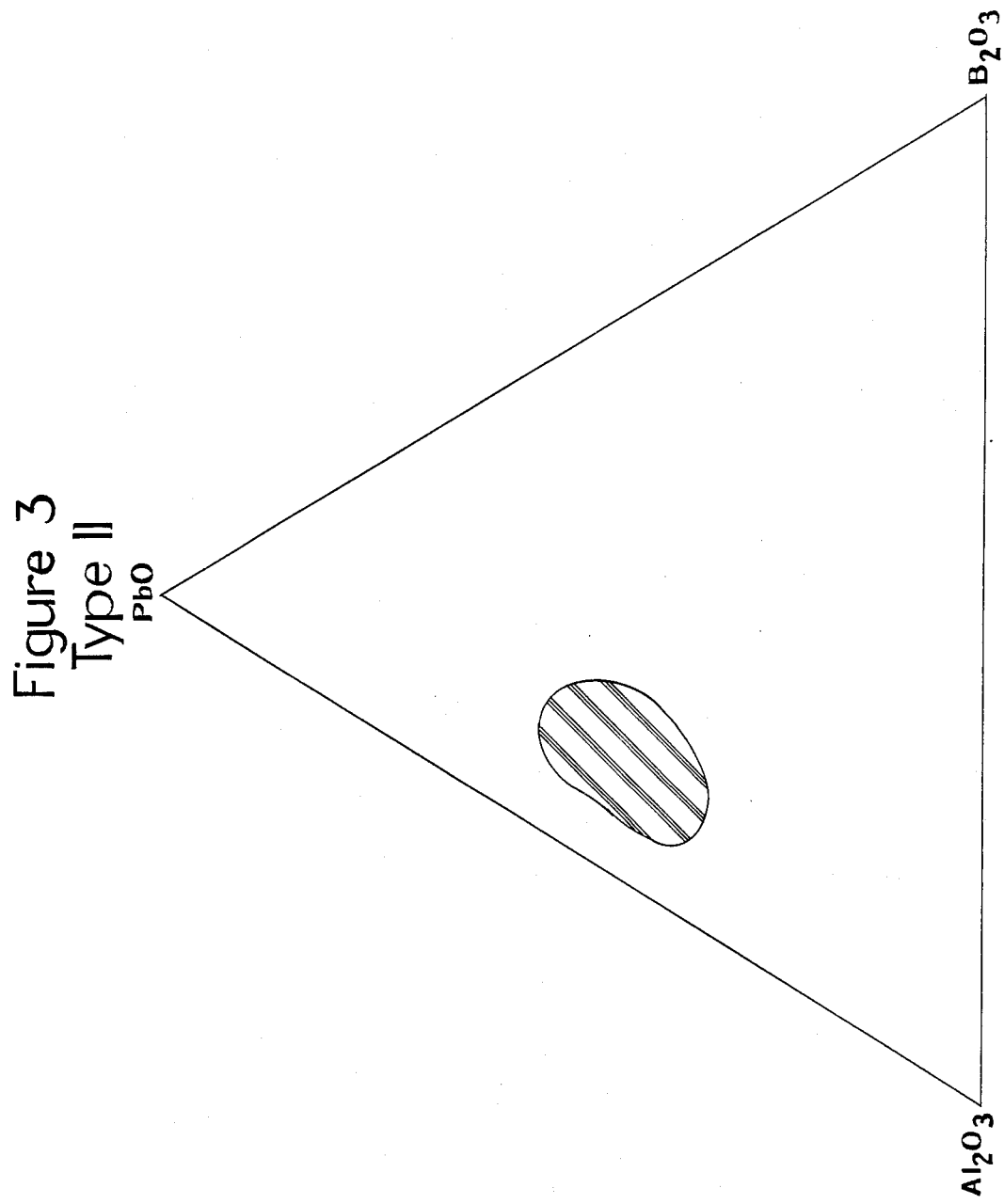

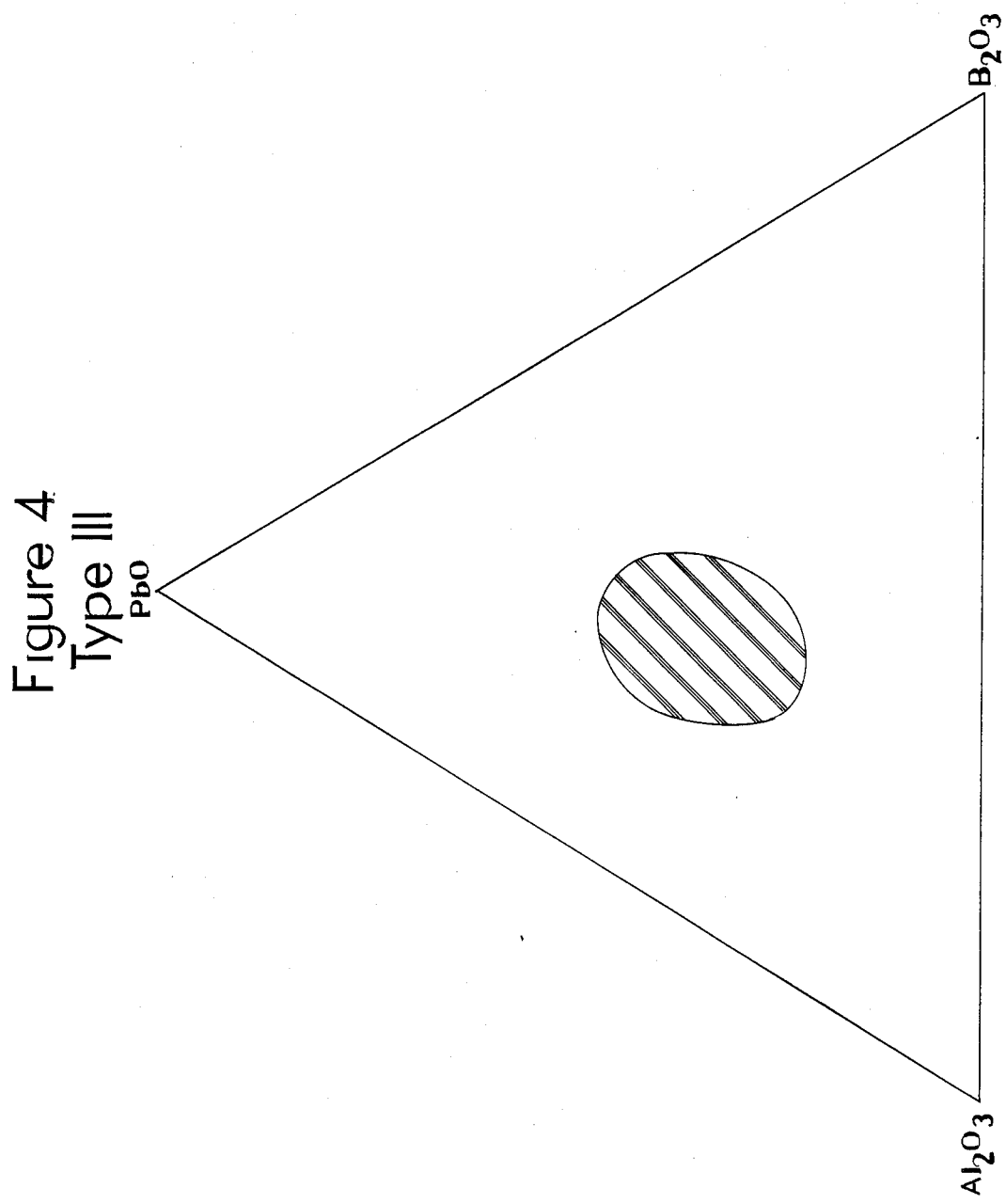

LEAD ALUMINUM BORATE

The present invention relates to lead aluminum borate. More particularly, the invention is directed to lead aluminum borate having the general formula (x) PbO.(y) $Al_2O_3$.(z) $B_2O_3$ where x, y and z are numbers representing molar amounts such that the mole fraction of PbO, calculated as $x/(x+y+z)$ is from about 0.2 to about 0.8; the mole fraction of $Al_2O_3$, calculated as $y/(x+y+z)$ is from about 0.05 to about 0.6; and the mole fraction of $B_2O_3$, calculated as $z/(x+y+z)$ is from about 0.05 to about 0.4. Lead aluminum borate of the present invention is useful as an oxidation catalyst for conversion of alcohols to aldehydes or ketones, for oxidative coupling of lower alkyl groups to aromatics, and for dimerization or cyclization of lower alkenes.

The use of lead oxide as a catalyst is disclosed in the literature. Keppel et al. U.S. Pat. No. 4,443,642 states that supported metal oxides, including supported lead oxide, are well known as catalysts and oxygen carriers for a wide variety of chemical reactions. Keppel explains such metal oxide compositions are generally comprised of a metal oxide coated on a inert support material of low porosity and low surface area. The method generally employed to produce these supported metal oxide compositions involves impregnating the inert support with a solution of a soluble salt of the metal oxide, separating the resultant impregnated solid, and heating to remove a substantial portion of the solvent. The impregnated solid is then calcined at elevated temperatures to convert the metal salt to the corresponding metal oxide. Keppel et al. is directed to a metal oxide composition comprising what is termed the "infusion and reaction" product of an alumina and at least one metal oxide. Suitable metal oxides in Keppel include lead (II) oxide. The composition of Keppel is shown to be useful for oxidatively dehydrogenating toluene to afford stilbene. Keppel et al. does not disclose a three component system of alumina, boria and lead.

Montgomery et al. U.S. Pat. No. 3,965,206 discloses a process involving the stoichiometric oxidative dehydro-coupling of toluene to afford stilbene in the presence of a solid metal oxide catalyst selected from the group consisting of the oxides of lead, cadmium and bismuth and mixtures thereof. Montgomery explains that the metal oxides may be employed alone or with a suitable support such as silica, alumina, silica-alumina, metal aluminate such as magnesium aluminate, and the like. A related patent is Fox et al. U.S. Pat. No. 3,980,580 which is directed to a composition containing oxygen, lead, magnesium, and aluminum for stoichiometric oxidative synthesis of stilbene from toluene and for demethylation of toluene to produce benzene.

Kovach U.S. Pat. No. 4,489,213 discloses a catalyst and process for alkylating aromatic compounds with olefin compounds. The catalyst is alumina having deposited thereon boria and a metal oxide selected from the group consisting of the oxides of tin or lead, a mixture of oxides of tin and lead, and a mixture of the oxides of tin, lead and manganese. Kovach states that the boria and metal oxide are added to the alumina by the use of water soluble salts. Calcination is recommended at temperatures between 450° and 550° C. Kovach calls for a concentration of boria in the finished catalyst of 0.5 to 15 wt. percent and a concentration of metal or metals (in elemental form) of 0.1 percent to 4.0 wt. percent. In terms of mole percent, the amount of boria in Kovach is 0.7 to 21.4 percent and the amount of metal is between 0.04 and 1.8 percent.

J. Zarzycki and F. Naudin "Supercritical Fluctuations in the $B_2O_3$-PbO-$Al_2O_3$ System" Journal of Non-Crystalline Solids 5 (1971) 415–425 discusses a melt composition of 77 percent $B_2O_3$, 18 percent PbO and 5 percent $Al_2O_3$ by weight. The composition disclosed is an amorphous glass material containing approximately 98 mole percent boria.

There is an ongoing need for new catalyst compositions for conversion of alcohols to aldehydes or ketones, for oxidative coupling of lower alkyl groups to aromatics, and for dimerization or cyclization of lower alkenes. Accordingly, an object of the present invention is to provide such a new catalyst composition. Other objects appear hereinafter.

It has now been found that the objects of the present invention are provided for in a new lead aluminum borate catalyst composition having the general formula (x) PbO. (y) $Al_2O_3$ .(z) $B_2O_3$ wherein x, y and z are numbers signifying the relative molar amounts of the oxides, $x/(x+y+z)$ being in the range of from about 0.2 to about 0.8, $y/(x+y+z)$ being in the range of from about 0.05 to about 0.6 and $z/(x+y+z)$ being in the range of from about 0.05 to about 0.4. Broadly speaking the lead aluminum borate of the present invention is a range of PbO.$Al_2O_3$.$B_2O_3$ compositions falling within the shaded area of the phase diagram depicted in FIG. 1. Briefly, within the shaded area of FIG. 1 we have identified three preferred formulations of the lead aluminum borate catalyst of the present invention falling within the above general formula. A first formulation (Type I) encompasses a range of (x) PbO.(y) $Al_2O_3$.(z) $B_2O_3$ preparations which comprise a crystalline phase and have the significant x-ray lines set forth in Table A, below. Type I lead aluminum borate is a range of compositions falling within the shaded area of the phase diagram depicted in FIG. 2. In Type I lead aluminum borate compositions the mole fraction of PbO is in the range of about 0.5 to about 0.8, the mole fraction of $Al_2O_3$ is in the range of about 0.05 to about 0.3 and the mole fraction of $B_2O_3$ is in the range of about 0.05 to about 0.25. Within this formulation range, a crystalline lead aluminum borate having substantially the formula 4 PbO .1 $Al_2O_3$.1 $B_2O_3$ (hereinafter referred to as "4-1-1 composition") is a particularly preferred Type I lead aluminum borate according to the present invention. This formulation has been found to possess utility as a catalyst for conversion of alcohols to aldehydes or ketones and for coupling of benzene and ethylene to form styrene. In particular, the 4-1-1 composition is an excellent catalyst for conversion of 2-butanol to methyl ethyl ketone. (See Example II.)

A second formulation of lead aluminum borate of the present invention (hereafter "Type II") comprises a range of compositions falling within the shaded area of the phase diagram depicted in FIG. 3 wherein the mole fraction of PbO is in the range of about 0.35 to about 0.55, the mole fraction of $Al_2O_3$ is in the range of about 0.30 to about 0.60 and the mole fraction of $B_2O_3$ is in the range of about 0.05 to about 0.2. Type II lead aluminum borate formulated in this compositional range possesses utility as a catalyst for dimerization of lower aliphatics such as the conversion of propylene to produce 1, 5-hexadiene, as well as for cyclization of propylene to form benzene. In this formulation range a preferred lead borate composition has the approximate formula 5 PbO.4 $Al_2O_3$. 1$B_2O_3$. (See Example 10.)

A third formulation of lead aluminum borate catalyst according to the present invention (Type III) comprises a range of compositions falling within the shaded area of the phase diagram depicted in FIG. 4, wherein the mole fraction of PbO is in the range of about 0.20 to about 0.50, the mole fraction of $Al_2O_3$ is in the range of about 0.20 to about 0.50, and the mole fraction of $B_2O_3$ is in the range of about 0.20 to about 0.40. Type III lead aluminum borate possesses utility for the oxidative coupling of aromatic compounds and lower aliphatics to afford aromatics having aliphatic side chains. In this formulation range a preferred lead aluminum borate composition has substantially the formula 9 PbO.5 $Al_2O_3$.6 $B_2O_3$.

In a further aspect, the present invention is directed to the lead aluminum borate compositions summarized above and further characterized in that such compositions are prepared by combining reagents comprising suitable precursors of lead oxide (PbO), aluminum oxide ($Al_2O_3$) and boron oxide ($B_2O_3$) and calcining the combination at a temperature in the range of about 600° to about 900° C.

In yet a further aspect, the present invention is directed to a process for manufacturing the lead aluminum borate compositions of the present invention which comprises combining reagents comprising suitable precursors of lead oxide (PbO), aluminum oxide ($Al_2O_3$) and boron oxide ($B_2O_3$) and calcining the combination, preferably at a temperature in the range of about 600° to about 900° C.

In still further aspects, the present invention is directed to the conversion of alcohols to aldehydes and ketones, the coupling of lower ($C_1$-$C_8$) aliphatics to aromatics, dimerization of lower aliphatics, and cyclization of olefins or olefin groups.

Throughout the present invention, the term "lead aluminum borate" shall be understood as denoting a range of compositions having the general formula (x) PbO. (y) $Al_2O_3$.(z) $B_2O_3$ where x, y and z are numbers representing the relative molar amounts of PbO, $Al_2O_3$ and $B_2O_3$ in the compositions such that the mole fraction of PbO calculated as $x/(x+y+z)$ is in the range of about 0.2 to about 0.8, the mole fraction of $Al_2O_3$ calculated as $y/(x+y+z)$ is in the range of about 0.05 to about 0.6 and the mole fraction of $B_2O_3$ calculated as $z/(x+y+z)$ is in the range of about 0.05 to about 0.4. It should be understood that the relative amounts of Pb, Al and B in the final calcined compositions of the present invention are expressed theoretically in terms of their oxides PbO, $Al_2O_3$ and $B_2O_3$ and are based on the relative starting molar amounts of the combined reagents serving as precursors of these oxides.

Type I lead aluminum borate compositions of the present invention according to the above described first formulation, i.e., compositions which are within the shaded area of the phase diagram of FIG. 2 where the mole fraction of PbO is from about 0.5 to about 0.8, the mole fraction of $Al_2O_3$ is from about 0.05 to about 0.3 and the mole fraction of $B_2O_3$ is from about 0.05 to about 0.25, comprise a unique distinguishing crystalline phase, as evidenced by the significant lines of their x-ray diffraction patterns, which cannot be assigned to any known composition. X-ray data were determined by standard techniques. The radiation was the K-alpha double lines of copper on a Scintag PAD IV spectrometer equipped with a liquid nitrogen cooled germanium solid state detector. The peak heights, I and the positions as a function of 2 times theta where theta is the Bragg angle, were read from the spectrometer chart. From these the relative intensities, 100 I/Io, where Io is the intensity of the strongest peak, and d (obs.), the interplanar spacing in A, corresponding to the recorded lines, were calculated.

The significant x-ray diffraction lines for a Type I lead aluminum borate of the present invention comprising a unique crystalline phase are set forth below in Table A.

TABLE A

| d (Angstrom) | Line Position 2 (Theta) Degrees | Intensity |
| --- | --- | --- |
| 5.29 | 16.74 | 23 |
| 4.69 | 28.90 | 79 |
| 4.63 | 19.17 | 33 |
| 3.49 | 25.50 | 31 |
| 3.20 | 27.82 | 25 |
| 3.10 | 28.76 | 13 |
| 3.07 | 29.03 | 43 |
| 2.98 | 29.92 | 100 |
| 2.88 | 31.08 | 24 |
| 2.80 | 31.98 | 28 |
| 2.76 | 32.52 | 11 |
| 2.52 | 35.57 | 30 |
| 2.22 | 40.63 | 25 |
| 2.01 | 44.97 | 20 |
| 1.89 | 48.03 | 9 |
| 1.89 | 48.18 | 9 |
| 1.68 | 54.61 | 23 |
| 1.65 | 55.72 | 19 |

Briefly, the lead aluminum borate compositions of this invention can be prepared by combining reagents comprising suitable precursors of lead oxide (PbO), aluminum oxide ($Al_2O_3$) and boron oxide ($B_2O_3$) and calcining the combined reagents. Preferably, the precursor reagents are combined in a liquid medium, following which the liquid is removed and the combination calcined.

Suitable precursors of lead oxide include lead nitrate, lead acetate, lead borate, etc. Suitable precursors or boron oxide include boric acid, lead borate, aluminum borate, boron oxides and ammonium borate. Suitable precursors of $Al_2O_3$ are alumina sols, aluminum nitrate, alumina, aluminum acetate, aluminum borate, etc. These precursor reagents are combined in relative molar amounts such that the final calcined lead aluminum borate composition satisfies the general formula (x) PbO. (y) $Al_2O_3$. (z) $B_2O_3$ wherein x, y and z represent the relative molar amounts of the oxides (based on the starting molar amounts of precursor reagents), and the mole fraction of PbO calculated as $x/(x+y+z)$ is from about 0.2 to about 0.8, the mole fraction of $Al_2O_3$ calculated as $y/(x+y+z)$ is from about 0.05 to about 0.6, and the mole fraction of $B_2O_3$ is from about 0.05 to about, 0.4.

In somewhat greater detail, the lead-containing and boron-containing reagents are desirably dissolved in water together with a water soluble aluminum salt and/or alumina in the form of sols or powder. The resulting mixture is preferably converted to a gel by the addition of aqueous ammonium hydroxide. Gel formation generally results in a more homogeneous precursor composition thereby improving the yield of desired catalyst upon calcination. The gelled precursor is dried (e.g., at atmospheric pressure or under vacuum) and then calcined at a temperature of about 600° to about 1000° C. At lower temperatures red and yellow lead oxides are formed. At higher temperatures an active catalyst is not formed. Preferably, calcination is carried out from about 650° to about 900° C. Calcination may be carried from about 2 to about 20 hours, preferably about 2 to 8 hours. The optimum calcination temperature is dependent on the particular lead aluminum borate formulation being calcined.

Type I lead aluminum borate compositions of the present invention (see FIG. 2) which comprise a unique crystalline phase characterized by the x-ray pattern of Table A are calcined in a preferred temperature range of about 670° to about 780° and are preferred for oxidative conversion of alcohols to aldehydes or ketones.

Type II lead aluminum borate compositions of the present invention (see FIG. 3) which are formulated from suitable precursors such that the starting mole fraction of PbO is from about 0.35 to about 0.55, the mole fraction of $Al_2O_3$ is from about 0.30 to about 0.60 and the mole fraction of $B_2O_3$ is from about 0.05 to about 0.2, are calcined at a preferred temperature of about 800° to 900° C. and are preferred for dimerization and cyclization of lower olefinic compounds, or olefinic groups.

Type III lead aluminum borate compositions of the present invention which are formulated from suitable precursors such that the mole fraction of PbO is from about 0.2 to about 0.5, the mole fraction of $Al_2O_3$ is from about 0.2 to about 0.5, and the mole fraction of $B_2O_3$ is from about 0.2 to about 0.40, are preferably calcined at about 800° to 900° C. and are preferred for oxidative coupling of lower aliphatics to aromatic compounds.

Either prior to or after calcination of the lead aluminum borate precursor mixture the composition may be treated with any one or more of the transition metals such as metals from Groups IB, IIB, IIIB, IVB, VB, VIB, VIIB and VIII of the Periodic Table. Suitable metals include zinc, cadmium, copper, silver, chromium, molybdenum, scandium, tungsten, manganese, titanium, rhenium, iron, cobalt, nickel, ruthenium, rhodium, palladium, osmium, iridium, vanadium, platinum, indium, thallium, tin, bismuth, antimony, etc. These metals (or compounds containing these metals compounds) can be applied as salts, oxides, etc., and if desired, thermally decomposed to give the corresponding metal or oxides.

EXAMPLE I

A Type I lead aluminum borate of the present invention having the approximate formula 4 PbO.1 $Al_2O_3$. 1 $B_2O_3$ (4-1-1 composition) and characterized by the x-ray diffraction pattern of Table A was prepared as follows: a solution of lead nitrate (56.81 g, 0.17 moles) boric acid (5.3 g, 0.086 moles), and 200 ml of distilled water was added to PHF alumina sol (56.1 g, 7.8 percent wt. solids, 0.043 moles) in a blending apparatus. After mixing for approximately five minutes, concentrated ammonium hydroxide was added with mixing to form a thick gel. This precursor was spread onto a plastic tray and allowed to air dry for two days. The sample was transferred to a glass crystallizing dish and vacuum dried at 120° C. with a nitrogen purge for 8 days. The material was subsequently calcined at 735° C. for 3 hours.

EXAMPLE II

A Type II lead aluminum borate according to the present invention having the approximate formula 5 PbO. 4 $Al_2O_3$.1 $B_2O_3$ was prepared by the procedures of Example I above except that 26.5 g of lead nitrate, 1.98 g of boric acid and 79.71 g of alumina sol were used and the calcination temperature was 850° C.

EXAMPLE III

A Type II lead aluminum borate according to the present invention having the approximate formula 7 PbO. 11 $Al_2O_3$. 2 $B_2O_3$ was prepared by the procedures of Example I above except that 20.87 grams of lead nitrate, 2.23 grams of boric acid and 23.3 grams of alumina sol were used. The calcination temperature was 850° C.

EXAMPLE IV

A Type III lead aluminum borate having the approximate formula 9 PbO. 5 $Al_2O_3$.6 $B_2O_3$ was prepared according to the procedures of Example I except that 56.67 g of lead nitrate, 12.61 g of boric acid and 105.9 g of alumina sol were used and the calcination temperature was 870° C.

EXAMPLE V

A Type III lead aluminum borate having the approximate formula 5 PbO. 9 $Al_2O_3$.6 $B_2O_3$ was prepared according to the procedure of Example I except that 33.17 grams of lead nitrate, 14.86 grams of boric acid and 166.8 grams of alumina sol were used. The calcination temperature was 870° C.

EXAMPLE VI

The Type I, III and III lead aluminum borates of the preceding examples were evaluated according to the following general procedures: one $cm^3$ of 18/35 mesh lead aluminum borate was mixed with 0.3 $cm^3$ of 18/35 mesh alpha alumina, an inert diluent. This mixture of solids was supported on a bed of alpha alumina and a glass wool plug in a 6 mm OD×19 cm long Vycor reactor tube. The packed tube was then heated to reaction temperature by a small electric tube furnace. All reactions were investigated at atmospheric pressure and the oxidant, $O_2$, was supplied to the reactor, diluted to about 8 percent with nitrogen. Liquid reactant was metered into the reactor by a syringe pump. The reactor effluent was maintained in the gaseous state until it had passed through a GC sampling valve which allowed periodic analysis of the organic products. After passing through the sampling valve, the condensable products were collected in a dry ice/isopropanol trap and the noncondensable gases were analyzed periodically for $O_2$, $N_2$, CO, and $CO_2$.

EXAMPLE VII

The oxidation of ethanol to acetaldehyde using the Type I lead aluminum borate catalyst of Example I was evaluated at 500° C. using the procedures outlined in Example VI. In this reaction, the dilute oxygen flow rate and ethanol feed rate were about 0.10 ml/sec. and 0.14 ml of liquid/hr., respectively. The CG analysis of the reactor effluent was completed using a column packed with Gas Chrom 220 and using an FID detector. The result of this analysis indicated a conversion of approximately 78 percent and selectivity of 76 percent. Thus, an overall Yield of about 59 percent acetaldehyde from ethanol.

EXAMPLE VIII

The oxidation of 2-butanol to methyl ethyl ketone using the Type I lead aluminum borate catalyst of Example I was evaluated at 100° C. using the procedures outlined in Example VI. The reaction was conducted with an oxygen flow rate of 0.1 ml/sec. and that of 2 butanol was 0.14 ml of liquid/hr. The reactor effluent was analyzed on a column packed with 0.2 percent carbowax 1500 on graphpac support. The results of this analysis indicated a conversion of about 98 percent and selectivity of 86 percent. This represents an overall yield of 84 percent.

EXAMPLE IX

Oxidative coupling of ethylene and benzene to afford styrene using the Type I lead aluminum borate of Example I was evaluated at 700° C. using the procedures outlined in Example VI above. The flow rates of dilute oxygen ethylene, and benzene were 0.098 ml/sec., 0.022 ml/sec., and 0.14 ml of liquid/hr., respectively. The effluent was analyzed on a OV17 column using an FID detector and conversions are approximate and based on benzene consumption. At a conversion of about 4 percent, the major products are styrene (70 percent selectivity) and biphenyl (15 percent selectivity).

EXAMPLE X

Oxidative coupling of propene to afford hexadiene and benzene using the Type II lead aluminum borate catalyst of Example II was evaluated at 600° C. using the procedures of Example VI. GC analysis indicated a conversion of propene of 38 percent, a selectivity to benzene of 38 percent and a selectivity to hexadiene 10 percent. The overall yield of coupled products was 19 percent.

EXAMPLE XI

Oxidative coupling of propene to afford hexadiene and benzene using the Type II lead aluminum borate of Example III was evaluated at 600° C. using the procedures of Example IV. GC analysis indicated a conversion of propene to coupled products of 35 percent, a selectivity to benzene of 25 percent, and a selectivity to hexadiene of 19 percent. The overall yield of coupled products was 15 percent.

EXAMPLE XII

Oxidative coupling of ethylene to benzene to afford styrene using the Type III lead aluminum borate of Example III was evaluated at 800° C. using the general procedures of Example VI. Analysis determined that styrene was produced in a yield of about 5 percent.

EXAMPLE XIII

Oxidative coupling of ethylene to benzene to afford styrene using the Type III lead aluminum borate catalyst of Example V was evaluated at 800° using the procedures of Example VI. The flow rate of $O_2$ was 0.1 ml/sec, the flow rate of ethylene was 0.35 ml/sec and the flow rate of benzene was 0.00234 ml/hr. Analysis of the effluent was carried out on a OV17 column using an FID detector, and indicated a yield of styrene of about 3%.

What is claimed is:

1. A crystalline lead aluminum borate composition consisting essentially of lead, aluminum, and boron oxides and having the general formula (x) PbO. (y) 24 .$Al_2O_3$. (z) $B_2O_3$ where x, y, and z are numbers representing molar amounts such that the mole fraction of PbO calculated as $x/(x+y+z)$, is within the range of about 0.5 to about 0.8; the mole fraction of $AL_2O_3$ calculated as $y/(x+y+z)$ is within the range of about 0.05 to about 0.3; and the mole fraction of $B_2O_3$ calculated as $z/(x+y+z)$ is within the range of about 0.05 to about 0.25 and said composition having the significant x-ray diffraction lines of Table A.

2. The crystalline lead aluminum borate of claim 1 represented by the shaded area of the phase diagram of FIG. 2.

3. The crystalline lead aluminum borate of claim 1 having the approximate formula 4 PbO. 1 $Al_2O_3$.1 $B_2O_3$.

4. Crystalline lead aluminum borate of the approximate formula 4 PbO./$Al_2O_3$.1 $B_2O_3$ having the significant x-ray diffraction lines of Table A prepared by combining, in a liquid medium, suitable precursors consisting essentially of lead, aluminum, and boron oxides, removing the liquid to obtain a superficially dry precursor combination, and calcining the combination at about 650 to 800° C. to obtain crystalline lead aluminum borate.

5. A process for preparing crystalline lead aluminum borate having the significant x-ray lines of Table A which process comprises (a) combining suitable precursors of lead, aluminum, and boron oxides in a liquid medium; (b) removing the liquid to obtain a superficially dry precursor mixture; and (c) calcining the mixture at 650 to 800° C.

6. The process of claim 5 wherein the liquid medium includes aqueous ammonia or aqueous ammonium salt.

* * * * *

UNITED STATES PATENT OFFICE
CERTIFICATE OF CORRECTION

Patent No.  4,767,738    Dated  August 30, 1988

Inventor(s)  John L. Melquist and Melvin L. Luetkens, Jr.

It is certified that error appears in the above-identified patent and that said Letters Patent are hereby corrected as shown below:

Patent reads:

| Col. | Line | | |
|---|---|---|---|
| 1 | 24 | "a inert" and should read | --an inert-- |
| 4 | 39-40 | "or boron" and should read | --of boron-- |
| 4 | 53 | "about," and should read | --about-- |
| 6 | 63 | "Yield" and should read | --yield-- |
| 8 | 9 | "carried out on a OV17" and should read | --carried out on an OV17-- |
| 8 | 15-16 | "(y) 24 · $Al_2O_3$ ·" and should read | --(y) $Al_2O_3$ ·-- |
| 8 | 19 | "$AL_2O_3$" and should read | --$Al_2O_3$-- |

Signed and Sealed this

Fourteenth Day of March, 1989

Attest:

DONALD J. QUIGG

Attesting Officer

Commissioner of Patents and Trademarks